United States Patent [19]

Higbee

[11] Patent Number: 4,765,558
[45] Date of Patent: Aug. 23, 1988

[54] SEAT BELT RETRACTOR
[75] Inventor: Wallace C. Higbee, Romeo, Mich.
[73] Assignee: TRW Automotive Products, Inc., Cleveland, Ohio
[21] Appl. No.: 589,679
[22] Filed: Mar. 15, 1984
[51] Int. Cl.⁴ .................. A62B 35/00; B65H 75/48
[52] U.S. Cl. .................. 242/107.4 A; 242/107.4 R
[58] Field of Search ............ 242/107.4 A, 107.4 B, 242/107.4 D, 107.7; 280/806; 297/478

[56] References Cited
U.S. PATENT DOCUMENTS

| | | | |
|---|---|---|---|
| 3,598,336 | 8/1971 | Frost | 242/107.4 D |
| 3,858,826 | 1/1975 | Sprecher | 242/107.7 |
| 3,897,913 | 8/1975 | Hall | 242/107.4 A |
| 3,999,723 | 12/1976 | Magyar | 242/107.4 D X |
| 4,402,473 | 9/1983 | Kubota | 242/107.4 A |
| 4,427,164 | 1/1984 | Rumpf | 242/107.4 R |
| 4,428,545 | 1/1984 | Naitoh | 242/107.4 A |
| 4,436,255 | 3/1984 | Matsui et al. | 242/107.4 A |

Primary Examiner—Stuart S. Levy
Assistant Examiner—Katherine Matecki
Attorney, Agent, or Firm—Tarolli, Sundheim & Covell

[57] ABSTRACT

A seat belt retractor of the vehicle sensitive type and which is selectively convertible to function as an automatic locking type seat belt retractor in which the protraction of the webbing to a particular extent achieves the conversion and the vehicle sensitive mode is restored upon a selected amount of webbing retraction.

11 Claims, 3 Drawing Sheets

SEAT BELT RETRACTOR

The present invention relates to seat belt retractors and more particularly to a vehicle sensitive seat belt retractor in which the vehicle sensitive locking feature converts in a self-actuating manner to an automatic locking feature upon selected withdrawal of seat belt webbing from the retractor.

BACKGROUND

Conventionally, the vehicle sensitive locking retractor, both with and without comfort mechanisms, are found in most current automotive vehicles. In general, the vehicle sensitive retractor structure involves a pendulum or other inertial structure which reacts to sudden acceleration, impact or deceleration and braking to cause a physical locking of the retractor against withdrawal of additional webbing. Typically, an inertial structure acts to move a lock pawl into stop engagement against a ratchet operably driven by the spool or reel of the retractor. This is an effective safety restraint for passengers and allows a freedom of movement not found in prior art automatic locking retractors. This occurs because the pawl is not placed in contact with the ratchet until the acceleration or deceleration reaches a selected value. Then, the vehicle sensitive lock acts in prevention of further withdrawal. However, in securing cargo, children's safety seats, and children's seat belts, it is important to set the webbing against the object or child and then rely upon the webbing to retain the locked position against any further withdrawal. Then, when the retractor is used with adults, it functions as a vehicle sensitive locking retractor. Something of this sort was accomplished in the U.S. Pat. No. 4,402,473 to Tatsushi Kubota and Mitsuaki Katsuno, and also in the U.S. Pat. No. 4,427,164 to Robert J. Rumpf. In those devices, manual control was provided to override the vehicle sensitive mechanism and to apply a bias against a pawl urging it into lock engagement with the ratchet structure. The principal limitation of such devices was in the fact that manual access to the retractor was necessary. If direct access was not possible, then a solenoid or mechanical linkage for remote manipulation of the pawl bias is required at the retractor. The device of Katsumi Naitoh in U.S. Pat. No. 4,428,545 characterizes the remote manipulative control over an automatic locking structure.

In the retractor device of the present invention, the vehicle sensitive locking function is disabled and the automatic locking function is engaged simply by self-actuation upon selected withdrawal of seat belt webbing to a point somewhat beyond normal usage. Then the retracting of the surplus webbing to the selected use around, say, the body of an infant, results in the locking of the webbing against any further withdrawal. Then, upon unbuckling and releasing the webbing, the automatic locking retractor feature is disabled and the vehicle sensitive inertial locking feature is restored.

This is achieved very simply and economically without the requirement for external circuitry or cable and remote manipulative paraphernalia. It is useable in dual spool and tandem spool arrangements without departure from the concept as applied to a single spool retractor. It is especially important where access to the retractor is not manually feasible but where the buckle belt or tongue secured to the end of the webbing is presented to the user in a convenient manner.

OBJECTS

Accordingly, the principal object of the present invention is to provide a selective webbing movement structure in which the webbing movement is monitored and self-actuates and shifts or converts the locking characteristics of the retractor from vehicle sensitive mode to automatic mode so as to make the retractor attractive in usage with adult passengers, with children and with objects which require a modicum of positive restraint at all times and wherein the restoration to vehicle sensitive mode is easily and naturally achieved without the intervention of levers and solenoids and the like, either at the retractor or for remote manipulation from the retractor location.

Other objects include simple and economic construction and reliability of the mechanism along with repetitive accuracy in performance and without material increase in weight or bulk, and these objects will be appreciated by those skilled in the art as the description proceeds.

IN THE DRAWINGS

FIG. 1 is a seat belt retractor in accord with the present invention and shown in an end elevation view to reveal the inertial sensor for vehicle sensitive control over the pawl which locks the webbing laden spools against retraction of webbing therefrom and indicating the housing secured to the frame which houses the structure required to self-actuate the conversion in response to selected withdrawal of webbing in engagement of the automatic locking function.

FIG. 2 is a front elevation view of the retractor of FIG. 1 showing the dual spool aspects and especially the housing and mechanism achieving the selected conversion of the retractors from initial vehicle sensitive mode to the selected automatic locking mode. The facing elevation plane is taken on line 2—2 of the FIG. 1 and the housing has been partially cut away to reveal the driving engagement or spur gear at the end of the shaft of the spool and against the geared cam plate.

FIG. 3 is a fragmental side elevation view of one of the spools in the dual spool structure and characterizing the relation between the ratchet on the spool, the lock pawl normally separated from the ratchet, the geared cam plate responsive in movement to the movement of the spool and the overcenter spring thrusting against the pivotal lever arm and the lever arm with its cam follower projection responsive to the restraints of the cam and to the bias of the spring.

Figure 10:
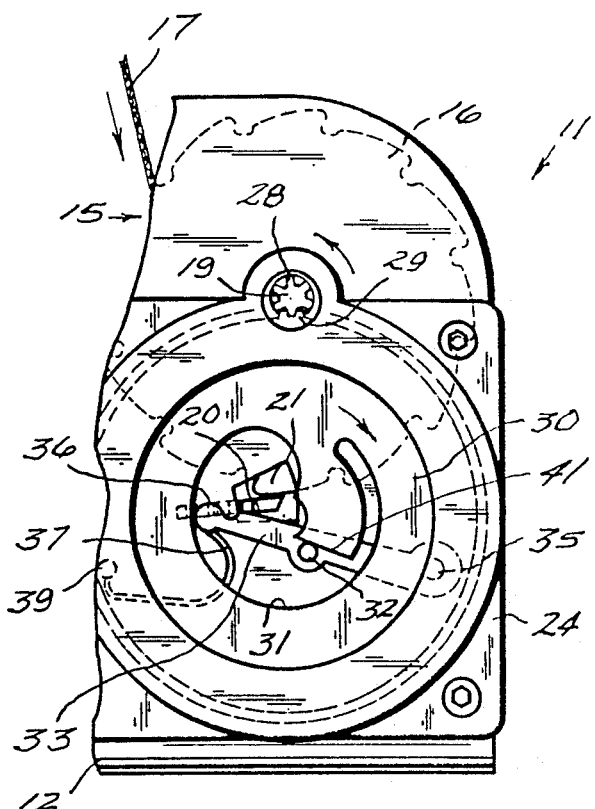
FIG. 10 is a fragmental side elevation view of the retractor as seen in FIG. 8 in which the cam plate is returning responsive to retraction of webbing and shows the first engagement of the lever at its follower by the cam all the while between FIG. 8 and the FIG. 10 the overcenter spring bias urges the pawl into contact with the ratchet.
Figure 12:
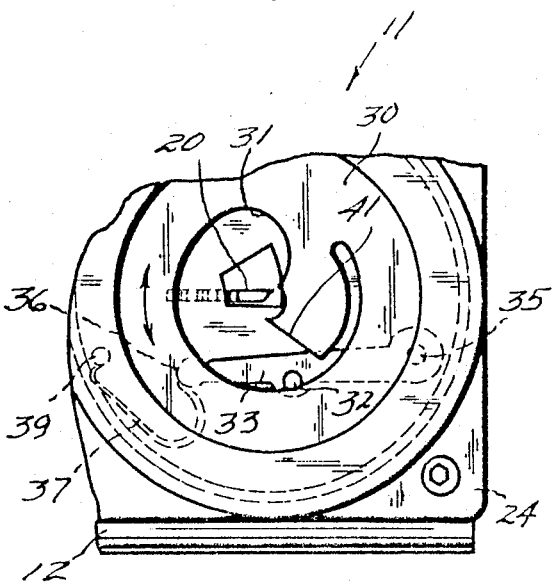

FIG. 12 is a fragmental and partial end elevation view of the retractor substantially as in FIG. 10 and where the cam has displaced the lever overcoming the initial overcenter bias of the spring to the lever and restoring the lever to its original position under the bias of the overcenter spring and blocked from any pivotal contact with the pawl until the cycle of webbing withdrawal shown in FIGS. 5 through FIG. 8 is restored and the automatic locking mode again obtains.

GENERAL DESCRIPTION

In general, a seat belt retractor having one or more spools for storage of seat belt webbing is operably supported in a frame. Each spool is connected to a rewind spring motor secured to the frame and operably connected to the spool. Each spool is lockable against rotation in one direction and movable in the other direction toward rewind. The spools include ratchet means rotatable with the spools. The spools are each on axes or shafts and one end of the shaft includes pinion means rotatable as the spool rotates. A pawl movable in the frame is provided for each of the spools and the pawl is tiltable into and out-of-engagement with the respective spool. The pawl, when engaged with the ratchet, prevents rotation of the spool when the spool is moved in a webbing or protracting withdrawal direction or when webbing is protracted from the spool. Under retraction of webbing onto the spool as urged by the spring retractor motor the pawls are ramped away from lock engagement against the ratchet of the spool.

Inertial means acting on the pawls or individual of them is normally in contact directly or indirectly with the pawl so that upon sensing any abrupt stop, start, or impact, the inertial element moves the pawl into lock mode. This describes a typical vehicle sensitive retractor. The retractor of the present invention, however, includes a means adjacent each spool which converts the mode of locking from "vehicle sensitive" to "automatic" by the selective engagement of the pawl against the ratchet of the corresponding spool.

SPECIFIC DESCRIPTION

Figure 1:
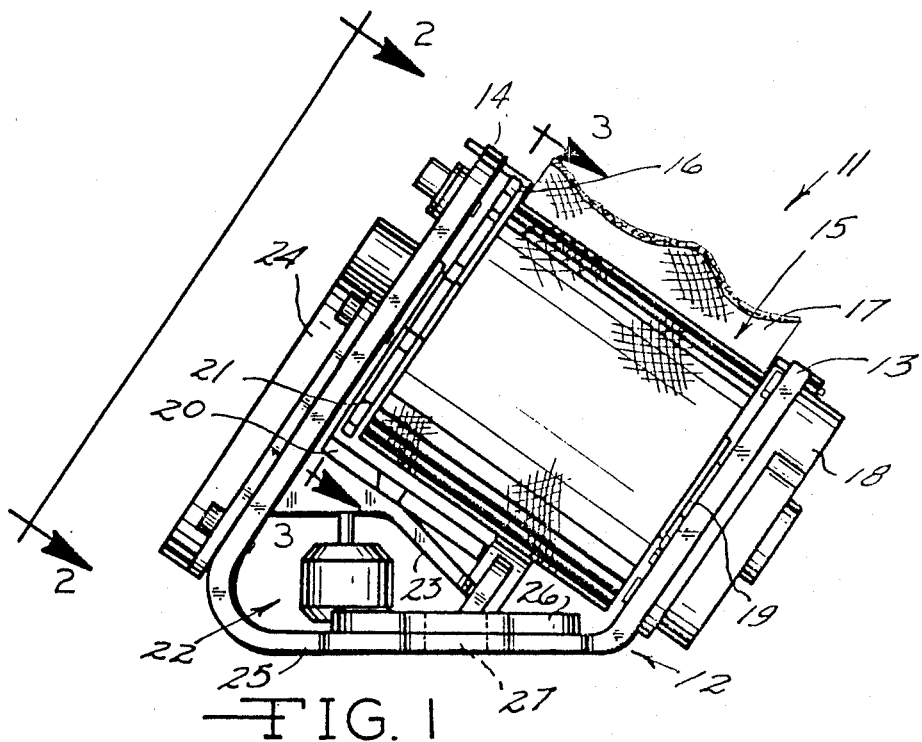

Referring to the drawings, and with first reference to the FIG. 1, there is shown a seat belt retractor 11 in accord with the present invention and comprising a frame structure 12 having at least a pair of upstanding flanges 13 and 14 in parallel spaced-apart relation and supporting and journalling for rotation at least one spool 15 therebetween. The spool 15 includes at least one ratchet flange 16 and each spool 15 includes seat belt webbing 17 wound thereon. Each spool 15 is operably connected to a spring rewind motor in the rewind motor housing 18. Such rewind motors are well known in the art and comprise a rewind spring wound around the shaft 19 of the spool 15 as it extends into the housing 18 and the rewind spring is attached thereto at one end. The other end of the flat wound spring is attached to the frame 12 or the housing 18 connected to the frame 12 and upon assembly as shown, applies a substantially constant bias to rewind the spool 15. As webbing 17 is withdrawn or protracted from the spool 15, the rewind spring gradually tightens and upon release of the webbing 17 the tightened spring winds the webbing 17 back onto the spool 15.

A pawl 20 is also supported by the frame 12 and is tiltable toward and away from lock engagement with the teeth 21 of ratchet 16. Upon withdrawal of the webbing 17, the teeth 21 make lock contact with the pawl 20 and further withdrawal is impossible. The locking stresses are transmitted into the frame 12 by the pawl 20 thrusting against the frame 12 in reaction to webbing withdrawal forces. The lock-up occurs on engagement of pawl 20 with teeth 21 as when the inertial sensor or pendulum 22 is displaced by inertial imbalance as upon sudden acceleration or deceleration of the vehicle in which the retractor 11 is mounted. The displacement of the pendulum 22 in respect to the saddle 23 causes the pawl 20, as will be seen, to engage the teeth 21 of ratchet 20 and the retractor restrains webbing 17 against withdrawal. The saddle 23 is a plastic support structure fastened in the frame 12 and normally supporting the pendulum 22 in a vertical manner. When the pendulum moves, the pawl 20 is displaced or tilted. As will be seen, however, and by reason of apparatus enclosed in the housing 24 fastened to the flange 14 of the frame 12, the pawl 20 is selectively manipulatable by the structure within the housing 24 and independent of inertial response. Locking via the mechanism in the housing 24 is automatic and, as will be seen, the conversion of the retractor 11 to function automatically is dependent upon a selected amount of rotation of the spool 15 by protraction of the webbing 17.

The web 25 of the frame 12 is connected to the flanges 13 and 14 and forms a floor of the frame 12. A reinforcement plate 26 is welded or otherwise attached to web 25 to strengthen the retractor 11 at the frame 12 and especially at its vehicular anchor points 27.

Figure 2:
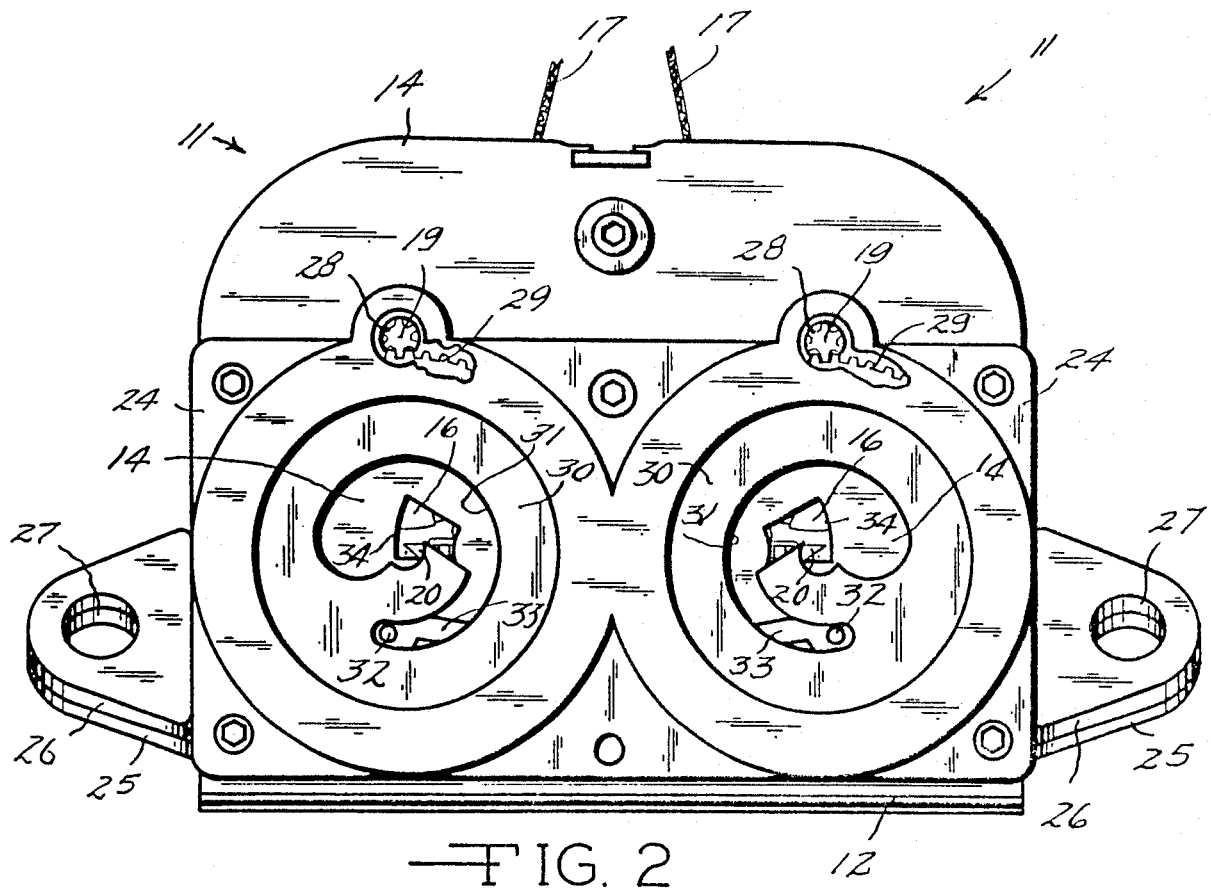

While a single spool 15 is visible in the FIG. 1, dual and tandem arrangements of plural spools 15 is contemplated as well as individual units as can be seen in reference to FIG. 2 in which the automatic actuation of the pawl 20 to lock mode can be best understood. The shafts 19 of the spools 15 extend through the flange 14 in journalled relation thereto and the ends of the shafts 19 include a pinion gear 28 which turns with the spool 15. The pinions 28 form a part of a gear train operably connected to the mating spur gear teeth 29 which are integral with or connected to the outer perimeter of cam discs 30. The internal camming portion 31 of the discs 30 function to selectively move, as will be seen, the follower or extension 32 and the spring loaded lever 33 which is attached to the follower 32. From the FIG. 2 the pawls 20 can be seen through the butterfly pivot window 34. The windows 34 are through the flange 14 of frame 12. The spools 15, behind the flange 14, are not visible except as the ratchet 16 can be seen through the window 34. The retractor 11 in dual spool form has both spools 15 in the fully retracted position. Upon protraction of webbing 17 from either or both of the spools 15, the pinions 28 will rotate accordingly and as withdrawal of webbing 17 occurs the cam discs 30 also move in accord with the selected gearing.

Figure 3:
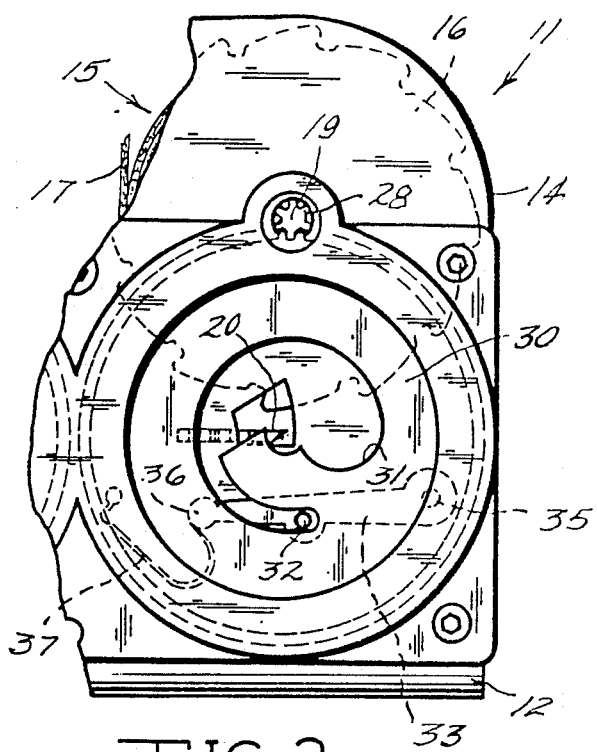
Figure 4:
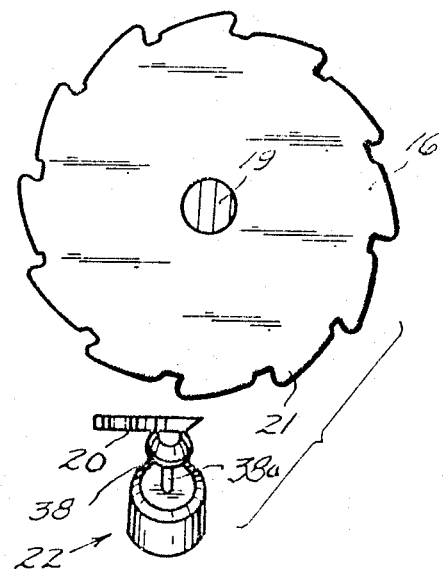
FIG. 4 illustrates, somewhat schematically in a fragmental end elevation of the ratchet, the position in which the pendulum type inertial sensor can function to lock the ratchet and the spool against protraction when an emergency is sensed inertially.

In FIG. 3 the configuration and positioning of the spring loaded lever 33 can be appreciated in respect to one of the spools 15. The cam portions 31 are in control of the follower 32 and accordingly the lever 33 on the pivot 35 is prevented from pivotal movement and the free end 36 is seen connected to the overcenter spring 37 which also applies a bias to the lever 33 against the outer perimeter of the working cam portions 31 as seen. This is the condition in FIG. 3 at full retraction so that the lever 33 is prevented from achieving control over the pawl 20. This condition obtains, as will be seen, until a selected withdrawal of webbing 17 occurs from the spool 15. Meanwhile, as will be seen, the vehicle sensitive lock mode (as pendulum 22 engageable with pawl 20) is fully operative and schematically the FIG. 4 shows the inertial element 22 poised in operative contact with the pawl 20 to pivot it upward and into lock engagement with the teeth 21 of the ratchet 16 when energized by sudden deceleration or acceleration of the vehicle in which the retractors 11 are installed. The cap portion 38 at the end of the rod extension 38a of the pendulum inertial element 22 may directly or indirectly engage and displace the pawl 20, as will be understood by those skilled in the art in accord with automotive design limitations and the positioning of the inertial element 22 in respect to the pawl 20 in frame 12. It will also be understood that by location and by extension, a single inertial element 22 can actuate more than one retractor 11. The FIG. 4 illustrates the functional aspect of the vehicle sensitive lock mode.

Figure 5:
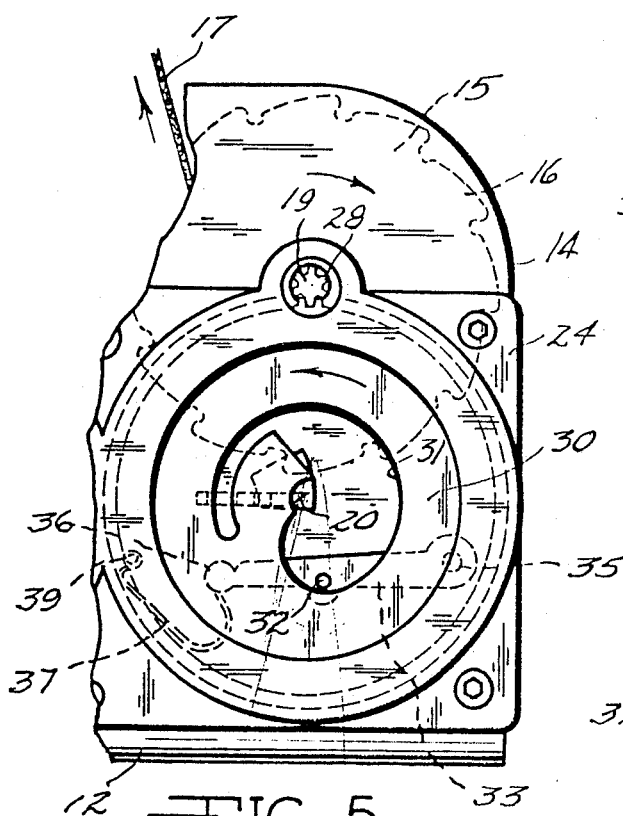
FIG. 5 is a fragmental side elevation of the retractor as in FIG. 3 and indicating that as the cam disc rotates to the position indicated, the lever has not left its initial position and the cam surface is preparing to lift the lever as webbing withdrawal proceeds.

In FIG. 5 webbing has been withdrawn from the spool 15 and the cam disc 30 has moved in accord with gearing of pinion 28 (turning with spool 15) the gear teeth 29 so that the cam portion 31 is positioned to start lifting the lever 33 to and beyond the overcenter point of spring 37.

Figure 6:
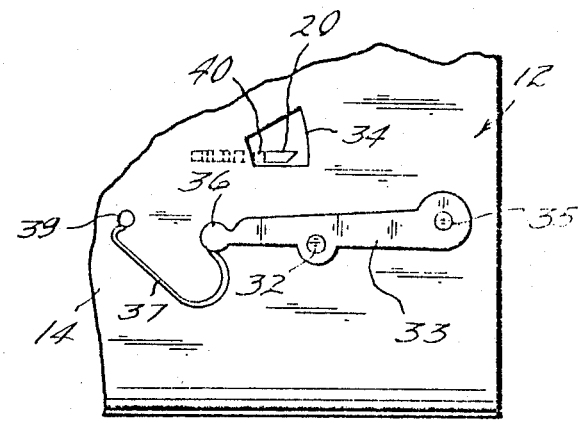
FIG. 6 is a partial side elevation view of the lever and its overcenter spring in a position separate from contact with the pawl and influenced by the overcenter spring away from movement toward the pawl.
Figure 7:
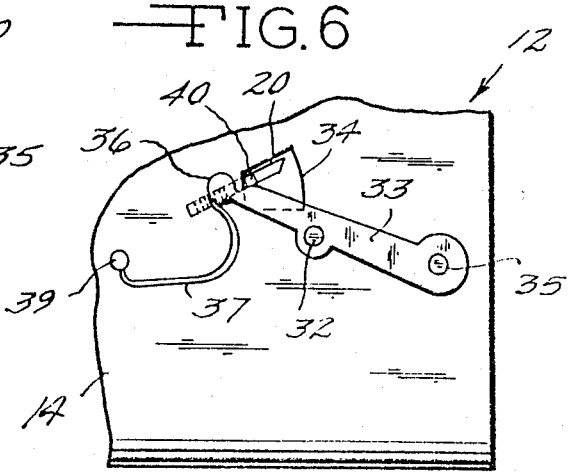
FIG. 7 is a partial side elevation view as in FIG. 6 and indicating the opposite extreme of the overcenter spring acting on the lever as it passes the center position and the spring biases the lever into an interference contact with the pawl and urges the pawl into engagement with ratchet teeth of the spool. The pawl is tilted upward in its arcuate movement window.

By reference to FIGS. 6 and 7 the operational sequence of the lever 33 is seen. In FIG. 6 the lever 33 cannot rock on pivot 35 to achieve movement against the pawl 20 since the bias of spring 37 and the cam portions 31 have not driven the lever 33 on the pivot 35 to the overcenter position of the spring 37 which is secured to the post 39 at its fixed end and to the head 36 of the lever 33 at its other end. In FIG. 7, the movement of the lever 33 has gone overcenter and the lever 33 (in accord with the lift of cam surface 31) is urged by spring 37 against the pawl 20 and has lifted pawl 20 so that it is in automatic lock mode against the ratchet 16, whatever the situation of the vehicle sensitive sensor 22. In fact, the lever 33 thrusts against the projection 40 to raise and tilt the pawl 20 as seen.

Figure 8:
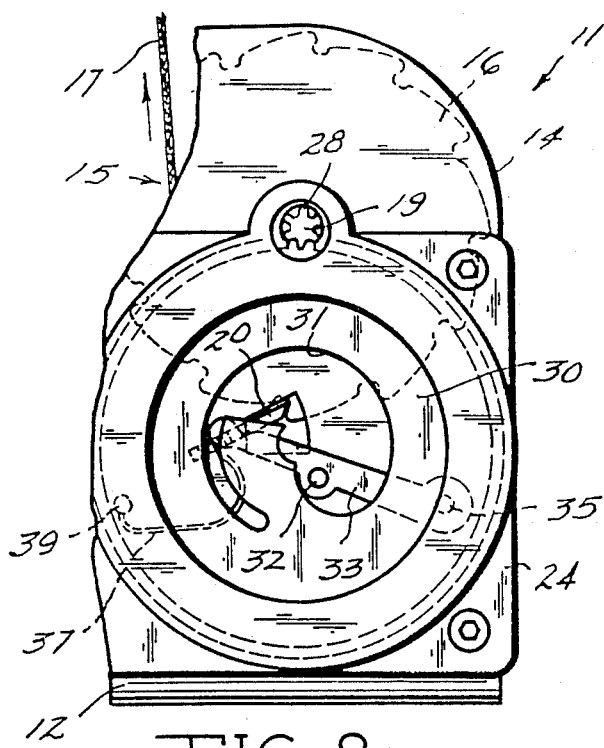
FIG. 8 is a fragmental side elevation as in FIGS. 3 and 5 and indicating that the pawl is urged by the lever and overcenter spring into lock contact with the ratchet of the spool in prevention of webbing withdrawal.
Figure 9:
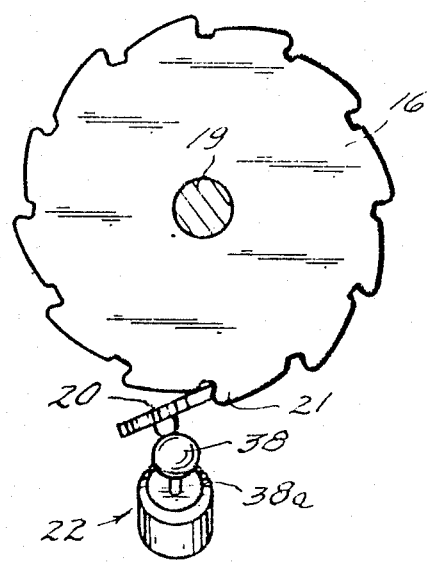
FIG. 9 is a fragmental side elevation as in FIG. 4 and characterizes the pawl position as locked by the function of the spring and lever against the ratchet of the spool and out-of-contact with the inertial sensing structure.

As postured in FIG. 7, the automatic lock mode will prevent any further withdrawal of webbing and as seen in FIG. 8 any withdrawal of webbing 17 while the pawl 20 is in contact with the ratchet 16 will result in locking the spool 15. In FIG. 9 it will be noticed that while the pawl 20 is locked against the teeth 21, the inertial sensor 22 is out-of-contact with the pawl 20.

Figure 11:
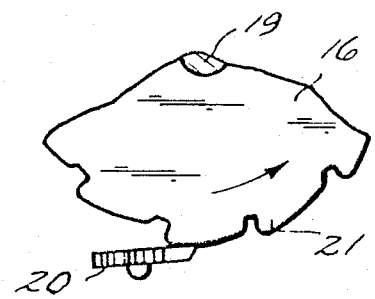
FIG. 11 is a fragmental end elevation as in FIGS. 4 and 9 and indicating that rewind or retraction can proceed while the pawl is urged against the ratchet in the automatic lock mode.

In FIG. 10 retraction of webbing 17 is proceeding as, for example, by allowing the webbing 17 to rewind on the spool 15 by the energy of the rewind spring motor (not shown) and corresponding return movement is occurring in the cam disc 30 and the buttress face 41 on the cam portion 31, in retraction, engages the follower 32 of the lever 33 and against the spring 37 until the lever 33 and spring 37 exceed the center position of the overcenter spring 37. This urges the lever 33 away from engagement with the pawl 20. In FIG. 11, the retraction movement of the spool 15, reflected in the retraction rotation of the ratchet 16, indicates that retraction can still occur in the automatic lock mode since the ramp portion of the teeth 21 presses the pawl 20 against the spring bias of the lever 33 (not shown).

At FIG. 12 the automatic mode has been cancelled and the overcenter spring 37 has now popped over the lever 33 at the selected point as permitted by the combination of overcenter spring 37 and cam surfaces 31 and webbing 17 can now be freely withdrawn subject only to the vehicle sensitive lock features. A conversion (by simple webbing withdrawal) from vehicle sensitive lock mode to automatic lock mode has been achieved and the vehicle sensitive lock mode can be restored selectively and without manual intervention having to occur at the retractors 11.

All that is required is to withdraw webbing 17 to a point beyond its usual extension and determined by the gearing 28 and 29 so that the pawls 20 are biased resiliently against the ratchets 16 of the spools 15. The webbing 17 is then retracted to the buckle connection, for example, around a child, and the retractor 11 is automatically locked against further retraction. The retractor 11 in automatic lock mode also may be applied to a child's seat or cargo on a vehicle seat around which the webbing restraint is sought. When unbuckled, the webbing 17 is rewound on the spools 15 to a point determined by the combination of cam and gearing and the vehicle sensitive mode for locking is restored.

As will be appreciated, the selection of conversion points is achieved by changing the gear relationships and by modifying the cam surfaces to achieve the selected conversion of modes at particular webbing extension.

Since no lock stresses are directly transmitted to or through the elements 18, (bulk of) 22, 24, 29, 30 and 33, these elements may all be made of durable and stable thermoplastics as, for example, available under the trade designation Nylon selected and formulated for excellent wear and dimensional stability over wide thermal and moisture ranges and capable of being produced in large quantities as by injection molding or the like so that the operative new parts in achieving the conversion features, in the present retractors, economies in material, in weight, and in production.

Having thus described my invention and a preferred embodiment thereof, others skilled in the art will appreciate modifications, changes and improvements and such modifications, changes and improvements as are within the skill of the art are intended to be included herein, limited only by the scope of my hereinafter appended claims.

I claim:

1. A seat belt retractor for a vehicle comprising a frame, a drum rotatably mounted in said frame and on which seat belt webbing is wound, ratchet means secured to and rotatable with said drum, locking means movable into engagement with said ratchet means to lock said ratchet means and thereby lock said drum against rotation in the direction of withdrawal of said selt belt webbing, and means for moving said locking means into engagement with said ratchet means in response to withdrawal of said selt belt webbing in excess of a predetermined amount, said means for moving said locking means into engagement with said ratchet means comprising a cam member rotatable in response to rotation of said drum, and lever means supported for pivotal movement about an axis parallel to the axis of rotation of said cam member and radially with respect to said cam member, said cam member being in the form of a ring having an opening therethrough, said ring having an outer peripheral surface, an inner peripheral surface, and opposite side surfaces extending between said outer and inner peripheral surfaces, said opening being defined by a camming surface formed on said inner peripheral surface, said camming surface having a radially changing profile with respect to said axis of rotation of said cam member for applying only radially directed force to said lever means to effect only radial movement thereof with respect to said cam member, said lever means comprising a follower member extending into said opening and engaging said camming surface for moving said lever means in first and second opposite directions, respectively, said camming surface having a first portion for moving said follower member and said lever means in said first of opposite directions radially with respect to said cam member to move said locking means into engagement with said ratchet means upon a predetermined angular rotation of said cam member in said direction of withdrawal of said seat belt webbing and having a second portion for moving said follower member and said lever means in said second of opposite directions radially with respect to said cam member to move said locking means out of engagement with said ratchet means upon a predetermined angular rotation of said cam member in a direction opposite said direction of withdrawal of said seat belt webbing.

2. A seat belt retractor as set forth in claim 1 wherein said drum comprises opposite shaft projections rotatably supported by said housing, said ring having gear teeth on the outer peripheral surface thereof, and a pinion gear mounted on one of said shaft projections, said pinion gear having teeth engaging said gear teeth to rotate said cam member in response to rotation of said drum.

3. A seat belt retractor as set forth in claim 1 further including a spring acting on said lever means, said lever means having a first position in which said lever means is spaced from said locking means and a second position in which it holds said locking means in engagement with said ratchet means, and said spring biasing said lever means away from said locking means when said lever means is in said first position and biasing said lever means into engagement with said locking means in said second position of said lever means.

4. A seat belt retractor as set forth in claim 1 wherein said first portion is arcuate and said second portion is straight.

5. A seat belt retractor as set forth in claim 4 wherein said camming surface is continuous.

6. A seat belt retractor which may be operated either as, an emergency locking retractor which prevents seat belt webbing from being withdrawn when the retractor is subjected to deceleration above a predetermined level, or as an automatic locking retractor which acts to retract said webbing but does not permit substantial withdrawal of said webbing comprising:
a retractor frame,
a spool rotatable within said frame and having at least one toothed sprocket,
a locking bar engageable with said toothed sprocket thereby preventing withdrawal of said webbing from said spool,
an inertia sensitive actuator acting upon said locking bar to cause engagement with said toothed sprocket when a deceleration level above said predetermined load is sensed,
a spring attached to said retractor frame movable between a first and a second position, in said first position, said spring permitting said locking bar to operate in response to said inertia sensitive actuator whereby said retractor operates as an emergency locking retractor, said spring being forced into said first position when said spool has a predetermined quantity of said webbing wrapped thereon, whereas when said spring is in said second position, said locking bar is forced by said spring into engagement with said toothed sprocket whereby said retractor operates as an automatic locking retractor, and
a switching lever affixed to said retractor frame, said switching lever acting upon said spring forcing said spring into said second position when said webbing is withdrawn from said spool.

7. A seat belt retractor according to claim 6 further comprising switching means associated with said webbing engaging said switching lever when said webbing is withdrawn from said spool.

8. A seat belt retractor according to claim 7 wherein said switching means comprises means which engages said switching lever.

9. A seat belt retractor according to claim 6 wherein said switching lever is pivotably attached to said retractor frame.

10. A seat belt retractor according to claim 8 wherein said switching lever forms first and second terminal ends, said second terminal end engaging said spring and moving said spring to said second position when said switching means engages said switching lever.

11. A seat belt retractor according to claim 8 wherein said switching lever pivots relative to a member component of said retractor frame.

* * * * *